United States Patent [19]

Roland et al.

[11] Patent Number: 6,107,368
[45] Date of Patent: Aug. 22, 2000

[54] ORGANIC-INORGANIC MORTAR

[75] Inventors: Gienau Roland, Westendorf; Pfell Armin, Kaufering, both of Germany

[73] Assignee: Hilti Aktiengesellschaft, Schaan, Liechtenstein

[21] Appl. No.: 09/357,438

[22] Filed: Jul. 20, 1999

[30] Foreign Application Priority Data

Jul. 21, 1998 [DE] Germany .............................. 198 32 668

[51] Int. Cl.[7] .............................. C08L 63/00; C04B 24/24
[52] U.S. Cl. .......................... 523/401; 523/402; 523/130; 523/131; 524/4; 524/3; 524/2
[58] Field of Search ..................... 523/130, 131, 523/401, 402; 524/2, 3, 4

[56] References Cited

U.S. PATENT DOCUMENTS 4,548,270 10/1985 Eilers ..................................... 166/291
4,839,102 6/1989 Kertesz et al. ............................... 524/4
5,322,562 6/1994 Ellenberger et al. ................... 106/661

FOREIGN PATENT DOCUMENTS 0207473 1/1987 European Pat. Off. .
0495336 7/1992 European Pat. Off. .
0589831 3/1994 European Pat. Off. .

Primary Examiner—Peter A. Szekely
Attorney, Agent, or Firm—Brown & Wood, LLP

[57] ABSTRACT

A curable two-component composition with curable organic and curable inorganic constituents and with curing agents, the curing agents being separated from the respective curable constituent so as to inhibit reaction, but activatable for application or use, containing epoxide and the finely particulate cement as curable constituents and amine and alkali silicate as curing agent.

22 Claims, No Drawings

ORGANIC-INORGANIC MORTAR

BACKGROUND INFORMATION AND PRIOR ART

Two-component mortar compositions are known. They are understood to be mortars, which contain one or more curable components on the one hand and, separately therefrom, curing agents on the other. The curing reaction is started by mixing the two components, for example, by destroying the reaction-inhibiting partitions or by expressing the components together through a static mixer.

Such two-component mortars are used particularly for fastening anchoring means in boreholes. Mortar compositions on an inorganic basis, with hydraulically setting constituents, such as cement or plaster, which can be cured by water, are known. Likewise, two-component mortar compositions on an organic basis are known, which mostly contain polymerizable compounds and are cured by being mixed with a polymerization initiator. However, two-component mortar compositions are also known, which contain cement and organic compounds, namely unsaturated polyester or vinyl ester, optionally together with reaction diluents, thickening agents and/or thixotropic agents, such as pyrogenic silica, in pasty form, as a curable constituent in the one component and water and peroxide as curing agent, optionally with further additives, such as thickening agents, thixotropic agents and the like (German Offenlegungsschrift 14 94 920, DE 42 31 161 A1) in the other component. Moreover, by means of two-component mortar compositions containing the cements and vinyl esters as curable constituents, it was possible to overcome the appreciable disadvantages of mortar compositions containing Portland cement and polyester, such as their inadequate shelf life, the low aging resistance of the fastening and the like.

OBJECT OF THE INVENTION

It is an object of the present invention to make available, for fastening anchoring means in boreholes, further two-component mortar compositions, which are not dependent on the necessary presence of vinyl esters, have a fully satisfactory shelf life and lead to fastenings of exceptional strength, recognizable, for example, by the high pull-out values. Moreover, the advantages of inorganic systems, such as dimensional stability at and resistance to elevated temperatures are to be retained.

SUMMARY OF THE INVENTION

The object of the invention accordingly is a curable, two-component mortar composition with curable organic and curable inorganic constituents and with curing agents, the curing agent being kept separate from the respective curable component so as to inhibit any reaction, except under use conditions, when it can be caused to react. Pursuant to the invention, epoxide and finely divided cement are contained as curable constituents and amine and alkali silicate as curing agent. Even after prolonged storage, the curing of the inventive mortar compositions occurs only when the curable constituents are caused to react with the curing agent, for example by mixing, for instance, owing to the fact that the epoxide is brought together for reaction with the amine curing agent and the finely particulate cement is brought together for reaction with the alkali silicate or the mixture of the curable constituents is brought together for reaction with the mixture of curing agent.

The epoxide compounds can be aliphatic, cycloaliphatic, aromatic or heterocyclic. They usually are polyepoxide with at least 1.5 epoxide groups per molecule. Aside from polyglycidyl esters, the preferred compounds include especially polyglycidyl ethers and here, especially the polyglydicyl ether derivatives of bisphenol A, bisphenol F and novolak. Epoxide compounds, which can be used within the sense of the present invention, are described, for example, in the "Handbook of Epoxy Resins", 1967, Lee and Neville.

It has proven to be advantageous if reactive diluents for the epoxides are contained in the inventive mortars. These include, above all, the low molecular weight, epoxy-functional ethers, which are known as reactive diluents, such as hexylene glycol diglycidyl ethers, butylphenyl glycidyl ethers, cresolphenyl glycidyl ethers, which are known as reactive diluents, and other ethers of glycidyl alcohols with multihydric phenols, optionally substituted with alkyl groups, polyacetoacetates, such as bis-, tri- or tetraacetoacetates of multihydric alcohols or polymethoxyalkanes, which are known as reactive diluents.

As cements, especially Portland cements, aluminate cements or high alumina cements and blast furnace slag cement, as well as their mixtures are suitable. In this connection, the introduction of aluminum-containing compounds, which make aluminum ions available during the reaction for the formation of cured products, for example, aluminum cement, has an advantageous effect on the stability of the cured product. Surprisingly, it has turned out that the size of the cement particles has a considerable effect on the pull-out values achievable with the inventive mortar compositions. The curing characteristics are also affected by the size of the cement particles. In particular, finely particulate cements with a specific surface area of 0.8 to 7 and, above all, of 3 to 6 $m^2/g$ (BET) have proven their value. Moreover, the properties, with respect to the pull-out values as well as with respect to the curing rate, can be modified by mixing the aforementioned cements with cements of smaller or larger specific surface areas.

For curing the epoxides, aliphatic and/or araliphatic amines, preferably alkylene polyamines, may be contained. Diethyltriamine and the homologous polyethylene polyamines, alicyclic polyamines, isophoron diamine and its derivatives are particularly preferred even at temperatures below room temperatures and as amines acting as curing agents. Particularly suitable also are Mannich bases, such those obtained by the condensation of aldehyde and phenols with amines having several amino groups. Preferably, the ratio of the number of amine hydrogen atoms to the number of epoxy groups is 3:1 to 0.8:1, an excess being less harmful than a substantial stoichiometric deficiency. The curing can be promoted by conventional curing catalysts, such as triethylamine.

The alkali silicates, preferably sodium and/or potassium silicate cure the cement as well as control the direction of the reaction. Appreciable amounts of the cement react with formation of gel-like compounds of the zeolite type. The alkali silicate concentration of the water glass generally range from 20 to 60% by weight, based on the total weight of aqueous carrier and alkali silicate. The values are not critical and are understood to be the total solids content and include subordinate amounts of hydrosols as well as silica precipitates, which are caused by the carbon dioxide content of the air and can no longer be peptized. For the sake of simplicity, the conventional, commercial concentrations, which contain about 30 to 55% and even up to 80% by weight, are preferred. The ratio by weight of the water contained in the water glass to cement usually ranges from 0.2 to 2.5 and preferably from 0.3 to 1.7.

The inventive two-component mortar compositions, together with the curable constituents and/or the curing agent constituents, may contain conventional fillers, such as quartz, chalk, kaolin, corundum, ceramic, glass, inorganic or organic fibers, as well as thickeners, solvents, dispersants, thixotropic agents, stabilizers, agents for controlling the curing rate and/or wetting agents or similar, known additives. Preferably, the curable constituents constitute 10–85% by weight, based on the weight of the curing agent-free total mortar composition.

The ratio by weight of the curable inorganic components to the curable organic components can vary within a wide range. The curable components forming the binders, namely the inorganic components of cement and alkali silicate (solid) and the organic components of epoxide, reactive diluents and amine, are contained in a ratio by weight of $\geq 0.5:1$. Preferably, the ratio by weight of said inorganic components to said organic components is between 1.0 and 5.0. It is preferred that the curable constituents be contained in the one component of the inventive two-component mortar composition and the curing agents be contained in the other component. It has proven to be advantageous if the component, which contains the curable constituents, has a liquid or, at the very least, a pasty consistency, as is the case, for example, for known mixtures of curable resin with reactive diluents and cement. At the same time, the rheological properties can be controlled by the content of pyrogenic silica or of other thixotropic agents. The adjustment of the semi-liquid or pasty consistency can also be affected by the state of aggregation of the reactive diluent-free epoxides, for example, by using the inherently liquid bisphenol A and F diglycidyl ethers. The rheology of the curing agent component, containing the water glass, can be adjusted by thickening agents, thixotropic materials or other viscosity-controlling additives so that the mixing with the liquid or pasty components and, with that, the curing reaction is facilitated. Curable components and curing agents can also be divided among the two components in such a manner, that the one component contains cement and liquid amine and the other component water, epoxide and, optionally, reactive diluent.

Two-component mortars, which contain constituents that control the curing rate of the cement, are particularly advantageous. The inventive, highly reactive compositions preferably contain substances, which retard the curing, such as alkali phosphate, preferably trisodium orthophosphate or its hydrate.

Yet another object of the invention is the use of the inventive two-component mortar composition mentioned above with epoxide and finely particulate cement as curable constituents and amine and alkali silicate as curing agents for fastening anchoring means such as tie bars and the like in boreholes, In particular, the invention also relates to the packaging of the inventive two-component mortar in two-chamber and multi-chamber systems. These include, in particular, cartridges of glass, plastic, foil or ceramic, in the interior of which the curable constituents are kept separately from the respective curing agent by destructible walls. Such cartridge systems are inserted in the boreholes. To initiate the curing reaction, the cartridge, including the partitions in the cartridge, are destroyed, for example, by driving in the tie bar. Such two-chamber or multi-chamber systems also include two or more foil bags for separating curable components and curing agents. In this case, the contents of the foil bags can be injected jointly, for example, over a static mixer, into the borehole. Aside from the reactive constituents, which are kept separate to prevent their reacting, these cartridge and foil bag systems contain, as usual, further mortar constituents, such as fillers, solvents, thickeners, thixotropic agents, materials to control the curing and the like.

The following examples serve to explain the invention.

EXAMPLE

|   |   | % by weight |
|---|---|---|
| A | sodium water glass (GVZ = 2.7) | 19.7 |
|   | sodium phosphate retarder (anhydrous) | 0.8 |
|   | polyamine curing agent | 1.9 |
|   | quartz sand (average particle size 0.24 mm) | 33.5 |
|   | finely ground quartz (spec. BET surface area of about 0.9 m$^2$/g) | 19.0 |
| B | Portland cement (spec. BET surface area of 4.4 m$^2$/g) | 9.3 |
|   | polyepoxide | 2.9 |
|   | reactive diluent | 2.9 |
|   | quartz sand (with an average particle size of 0.24 mm) | 10.0 |

For curing, components A and B are mixed in a ratio of 1:1.

What is claimed is:

1. Curable two-component mortar composition with curable organic and curable inorganic constituents and with curing agents, the curing agents being separated from the respective curable constituent in a reaction inhibiting manner but activatable for application or use, characterized in that epoxide and cement with a specific surface area of 0.8 to 7 m$^2$/g determined by the BET method are contained as curable components and amine and alkali silicate are contained as curing agent.

2. The mortar composition of claim 1, wherein a reactive diluent for the epoxide is provided.

3. The mortar composition of claims 1 or 2, characterized in that the epoxide contains at least 1.5 epoxide groups per molecule.

4. The mortar composition of claim 1, characterized in that at least one of the Portland or the aluminum-containing cement, selected from the group consisting of aluminate cement and high alumina cement are contained.

5. The mortar composition of claim 1, characterized in that the cement has a specific surface area of 3 to 6 m$^2$/g, determined by the BET method.

6. The mortar composition of claim 1, characterized in that at least one of the aliphatic and the araliphatic amines, selected from the group consisting of alkylene polyamines and Mannich bases are contained.

7. The mortar composition of claim 1, characterized in that the ratio of the number of amine hydrogens to the number of epoxy groups is 3:1 to 0.8:1.

8. The mortar composition of claim 1, characterized in that the alkali silicate is selected from the group consisting of sodium silicate and potassium silicate.

9. The mortar composition of claim 1, characterized in that the alkali silicate concentration is 20 to 60% by weight, based on the total weight of the aqueous carrier and alkali silicate.

10. The mortar composition of claim 1, characterized in that the ratio by weight of water, contained in alkali silicate, to the cement ranges from 0.2 to 2.5.

11. The mortar composition of claim 1, characterized in that at least one of the curable components and/or the curing agents is one selected from the group consisting of fillers, thickeners, solvents, dispersants, thixotropic agents, stabilizers, materials for controlling the curing rate and wetting agents.

12. The mortar composition of claim 1, characterized in that the curable components constitute 10 to 85% by weight, based on the total weight of the mortar composition without the curing agent.

13. The mortar composition of claim 1, characterized in that the ratio by weight of the inorganic curable component of cement and the alkali silicate (dry) to the organic curable component of epoxide, amine and reactive diluent, thus present, is $\geq 0.5:1$.

14. The mortar composition of claim 1, characterized in that the curable constituents are contained in the one component and the curing agent in the other component.

15. The mortar composition of claim 14, characterized in that the component, containing the curable constituent, has a liquid to pasty consistency.

16. The mortar composition of claim 1, characterized in that substances are contained, which control the curing of the cement and retard the curing process.

17. The mortar composition of claim 16, characterized in that alkali phosphates consisting of trisodium orthophosphate, are contained.

18. The mortar composition of claim 1, characterized in that the ratio by weight of epoxide to reactive diluent is 1:99 to 99:1.

19. A method for fastening anchoring means in boreholes which comprises filling the borehole with mortar of claim 1 and inserting the anchoring means.

20. The method of claim 19, wherein the mortar composition of claim 18 includes at least one of a two-chamber and a multi-chamber system.

21. The mortar composition of claim 10, characterized in that the ratio by weight of the water to the cement ranges from 0.3 to 1.7.

22. The mortar composition of claim 13, wherein the ratio by weight of the inorganic component to the organic component is between 1.0 and 5.0.

* * * * *

UNITED STATES PATENT AND TRADEMARK OFFICE
CERTIFICATE OF CORRECTION

PATENT NO. : 6,107,368
DATED : August 22, 2000
INVENTOR(S) : Roland Gienau, et al.

It is certified that error appears in the above-identified patent and that said Letters Patent is hereby corrected as shown below:

On the Title Page:

Item [75] Inventors: Roland Gienau, Westendorf; Armin Pfeil, Kaufering, both of Germany Signed and Sealed this Fifteenth Day of May, 2001

Attest:

NICHOLAS P. GODICI

*Attesting Officer*     *Acting Director of the United States Patent and Trademark Office*